United States Patent [19]
Stone

[11] Patent Number: 5,294,774
[45] Date of Patent: Mar. 15, 1994

[54] LASER MARKER SYSTEM

[75] Inventor: J. James Stone, Northbrook, Ill.

[73] Assignee: Videojet Systems International, Inc., New Prague, Minn.

[21] Appl. No.: 103,061

[22] Filed: Aug. 3, 1993

[51] Int. Cl.⁵ .............................................. B23K 26/00
[52] U.S. Cl. ........................... 219/121.77; 219/121.74; 219/121.75
[58] Field of Search ........... 219/121.7, 121.71, 121.74, 219/121.75, 121.77

[56] References Cited

U.S. PATENT DOCUMENTS

| | | | |
|---|---|---|---|
| 4,652,722 | 3/1987 | Stone et al. | 219/121.76 |
| 5,223,693 | 6/1993 | Zumoto et al. | 219/121.68 |
| 5,229,573 | 7/1993 | Stone et al. | 219/121.68 |
| 5,229,574 | 7/1993 | Stone | 219/121.68 |

*Primary Examiner*—C. L. Albritton
*Attorney, Agent, or Firm*—Rockey, Rifkin and Ryther

[57] ABSTRACT

A laser marker system for marking indicia onto a substrate includes an exit lens having a focal length and a single laser source. The surface of the substrate to be marked is positioned generally at the focal plane of the lens. The single laser source is arranged so that its energy output beams are oriented in a generally parallel relationship. The single laser source includes segmented reflecting means for generating a plurality of output energy beams to create a column of spots on the substrate with a higher resolution. The segmented reflecting means is comprised of a back-reflecting mirror which is formed of a plurality of different mirror segments. A device is provided for moving each of the plurality of different mirror segments between a lasing position and a non-lasing position to vary the number of output energy beams and thus the number of spots on the substrate.

21 Claims, 3 Drawing Sheets

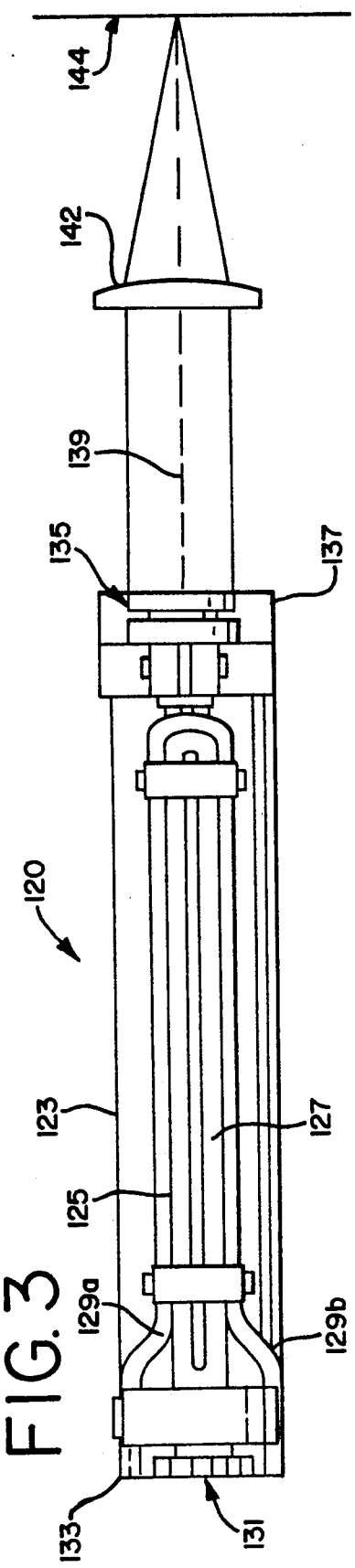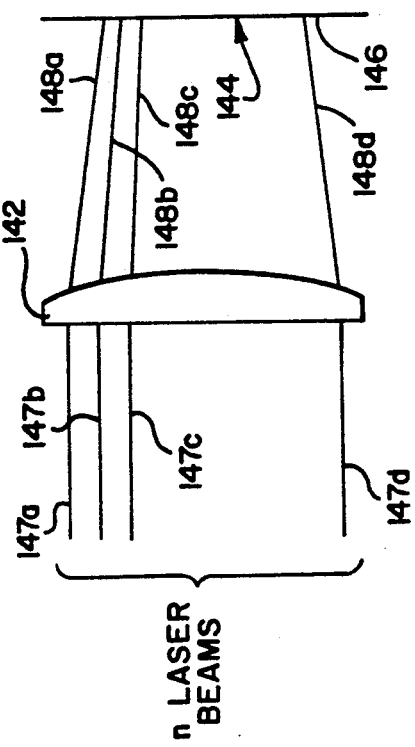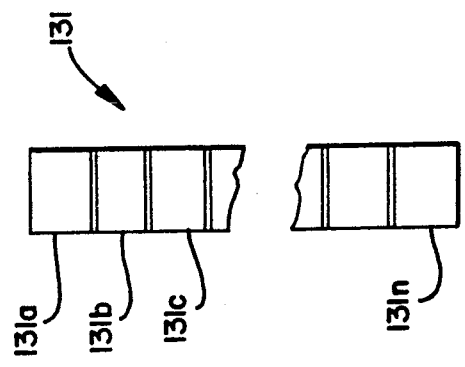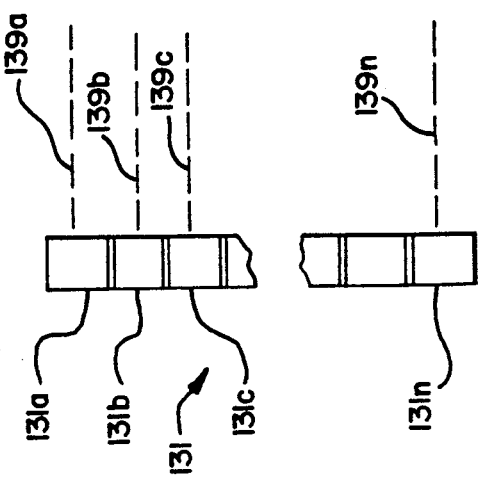

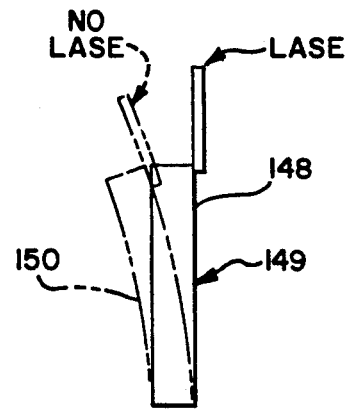
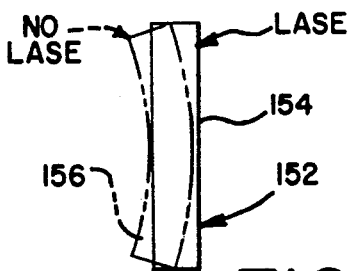
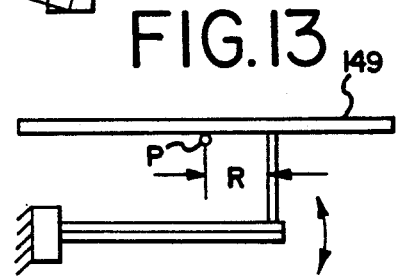
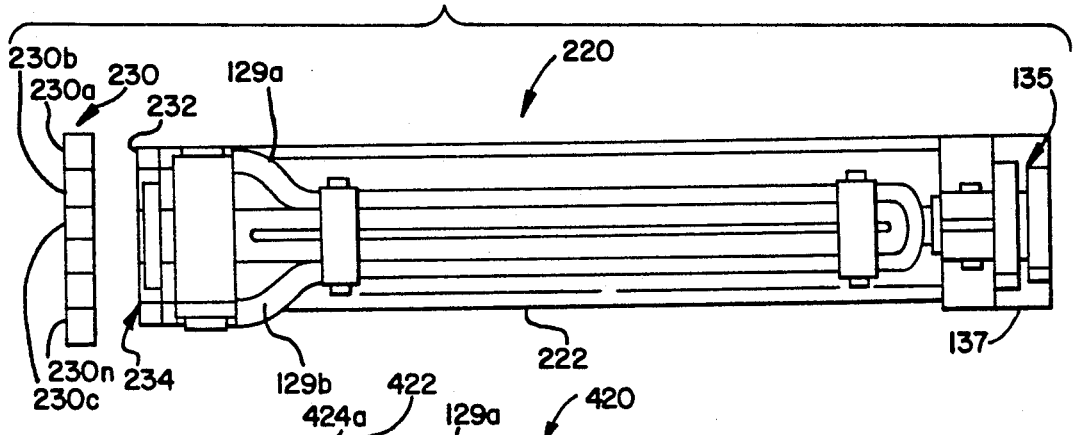
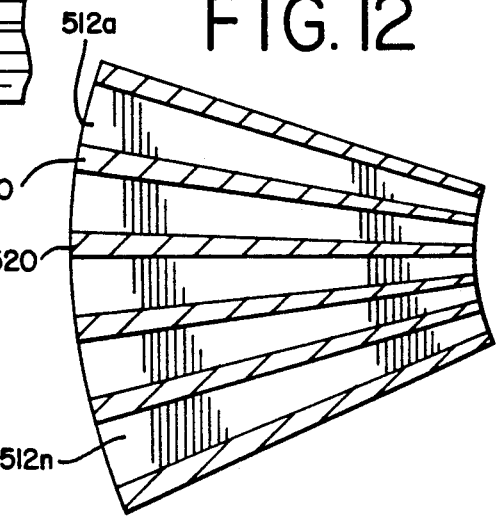
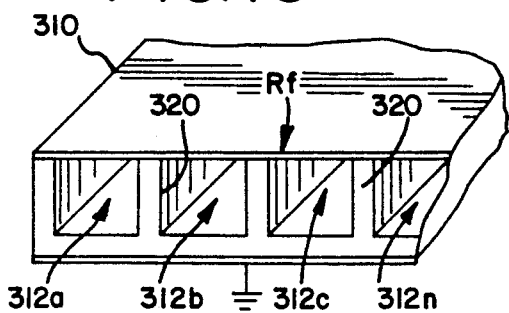

LASER MARKER SYSTEM

BACKGROUND OF THE INVENTION

This invention relates generally to apparatuses for marking moving objects or substrates and more particularly, it relates to an improved laser marker system for suitably coding paper labels, other substrates, printed material, plastic, painted surfaces and the like in which the number of dot positions in a vertical column is increased, thereby producing a higher resolution than has been traditionally available.

In U.S. Pat. No. 4,652,722 issued on Mar. 24, 1987, there is disclosed a laser marking apparatus which utilizes seven lasers for generating a 7-dot high character matrix and is assigned to the same assignee as the present invention. In particular, the laser beam from each source is directed by fixed mirrors through a single exit lens and then onto the surface to be marked. Individual laser mirrors each corresponding with one of the lasers are not movable and remain stationary during normal operation of the apparatus, even though they are adjustable for initial system alignment. The surface to be marked is positioned on a conventional conveyor or other device adapted to move the objects along a linear path adjacent the laser output head.

Each laser defines an essentially collimated energy source which is focused, by the exit lens, into a dot of a predetermined small size for precision marking of article surfaces as they pass the output head substantially in the focal plane thereof. The incident angle of each of the seven laser sources onto the exit lens is initially adjusted to provide a plurality of closely spaced and focused dots which define a vertical column of seven energy dots from which the character matrix can be obtained by modulation of the dots as the article or substrate is moved past the exit lens.

In order to produce a higher printing quality for the character matrix and increase the number of types of the character matrix that can be printed, there is needed to generate a higher number of spots or dots for each vertical column. Simply increasing the number of the present seven lasers in the '722 patent is impractical since the system costs would increase dramatically due to the increased components used. For example, if it was desired to provide a vertical column of 21 dots so as to improve the resolution by a factor of three, then there would be required an additional 14 lasers and associated components therefor. Also, it has been envisioned that the laser mirror 24 of the '722 patent used to reflect the beams from the respective mirrors 36a–36g via the delivery tube 18 to the exit lens 26 through the delivery tube 20 could be simply rotated so as to move the seven dots up or down to produce the 21 dots. However, this technique would require that the diameter of the exit lens 26 be increased by approximately two inches, thereby increasing substantially the system costs.

Accordingly, there has arisen a need for an improved laser marker system which has a higher resolution but without increasing substantially its cost and complexity. The present invention represents an improvement over the aforementioned U.S. Pat. No. 4,652,722. This '722 patent is hereby incorporated by reference.

SUMMARY OF THE INVENTION

Accordingly, it is a general object of the present invention to provide an improved laser marker system which is relatively simple and economical to manufacture and assemble.

It is an object of the present invention to provide a laser marker system for marking indicia onto a substrate in which the number of dot positions in a vertical column is increased, thereby producing a higher resolution than has been traditionally available.

It is another object of the present invention to provide a laser marker system which includes a single laser source having segmented reflecting means for generating a plurality of output energy beams to create column of spots on a substrate with a higher resolution.

It is still another object of the present invention to provide a laser marker system which includes means for moving each of a plurality of different mirror segments between a lasing position and a non-lasing position to vary the number of output energy beams and thus the number of spots on a substrate.

In accordance with these aims and objectives, the present invention is concerned with the provision of improved laser marker system for marking indicia onto a substrate which includes an exit lens having a focal length and a single laser source. The surface of the substrate to be marked is positioned generally at the focal plane of the lens. The single laser source is arranged so that its energy output beams are oriented in a generally parallel relationship. The single laser source includes segmented reflecting means for generating a plurality of output energy beams so as to create a column of spots on the substrate with a higher resolution. The segmented reflecting means is comprised of a back-reflecting mirror which is formed of a plurality of different mirror segments.

Another aspect of the present invention includes means for moving each of the plurality of different mirror segments between a lasing position and a non-lasing position to vary the number of output energy beams and thus the number of spots on the substrate.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 3 is an enlarged schematic representation of the single laser source 120 in FIG. 2;

FIG. 4 is a side elevational view of the back-reflecting mirror 130 in FIG. 3;

FIG. 5 is a front plan view of the back-reflecting mirror in FIG. 3;

FIG. 6 is a schematic elevational view of the laser optical relationships for the n laser beams from the single laser source 120 onto the focal plane via a focusing lens;

FIGS. 7 and 8 are schematic representations, illustrating how the back-reflecting mirrors are changed from a lasing position to a non-lasing position;

FIG. 9 is a schematic representation of a second alternate embodiment for the single laser source 120 of FIG. 3;

FIG. 10 is a schematic representation of a third alternate embodiment for the single laser source being formed in a multi-cavity block;

FIG. 11 is a partial view, similar to FIG. 3, but illustrating an alternate embodiment of how the back-reflecting mirrors are changed from a lasing position to a non-lasing position;

FIG. 12 is a view, similar to FIG. 10, but illustrating a fourth alternate embodiment for the single laser source being formed in a tapered multi-cavity block; and FIG. 13 is a schematic representation of a rotating device for the individual mirror segment 149.

DESCRIPTION OF THE PREFERRED EMBODIMENTS

Figure 1:
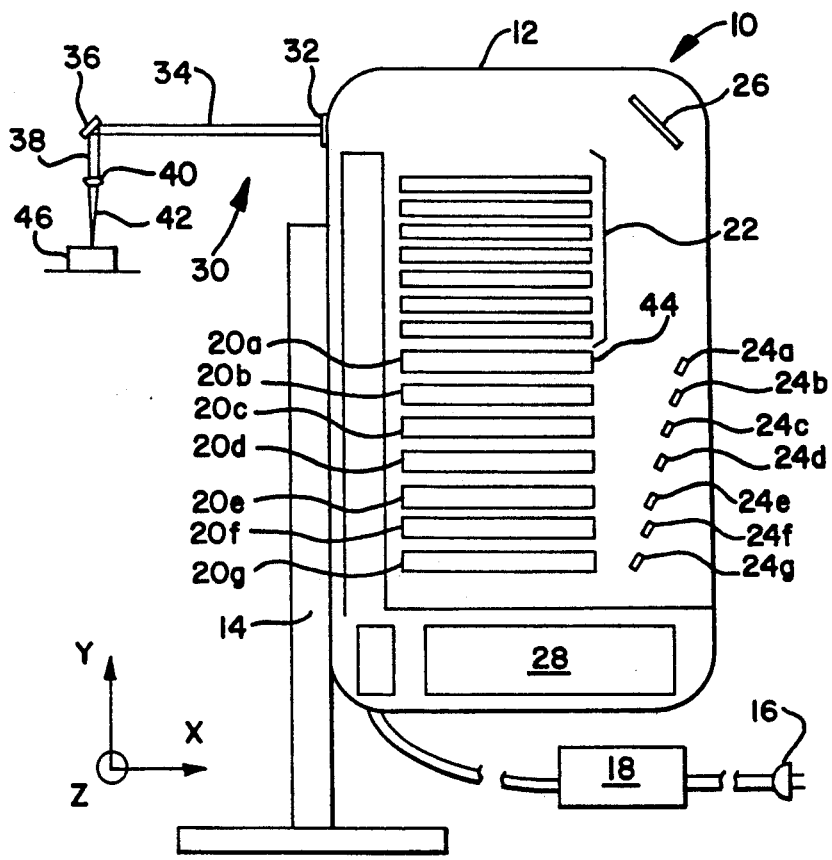
FIG. 1 is an elevational diagrammatical representation of a laser marker apparatus of the prior art.

Referring now in detail to the drawings, there is shown in FIG. 1 a diagrammatical representation of a laser marker apparatus 10 of the prior art. The laser marker apparatus of the prior art is adapted to mark or inscribe alphanumeric characters or other symbols definable within a matrix of predetermined number of dot rows onto the surface of movable articles, such as product packaging, beverage containers, bottle closures, labels, substrates and the like. The laser apparatus 10 includes a housing or cabinet 12 mounted on a support stand structure 14 and being adapted to receive a source of power via an A.C. wall-plug 16 and a power conditioning unit 18.

The cabinet 12 is used to house a plurality of lasers 20a-20g, a corresponding number of RF laser excitation sources 22 over the respective lasers, a plurality of turning mirrors 24a-24g, an interior directing mirror 26, and a microprocessor controller 28. A laser head unit 30 is mounted exteriorally of the upper end portion of the cabinet 12 via a mounting flange 32. The head unit is comprised of a horizontal beam delivery tube 34, an exterior directing mirror 36, a vertical beam delivery tube 38, and an exit lens 40. The directing mirror 36 is located at the intersection of the horizontal and vertical delivery tubes 34, 38. The exit lens 40 is preferably arranged at the lower end of the vertical lens tube which is movable telescopingly in the delivery tube 38 so as to permit focusing.

The laser apparatus 10 is described with reference to the coordinates X, Y, and Z of the orthogonal coordinate system illustrated in the drawings. In the preferred embodiment, the seven lasers 20a-20g are formed of a water cooled $CO_2$ gas laser type and arranged vertically in the Y-direction within the cabinet 12, as illustrated in FIG. 1. The energy output beams from these lasers are passed through their respective output ends 44 in the X-direction and then impinge upon corresponding seven turning mirrors 24a-24g. The seven lasers 20a-20g direct substantially collimated energy beams, which have a divergence of approximately 4 milliradians, into the corresponding seven turning mirrors 24a-24g. The turning mirrors reflect the beams off the directing mirror 26, through the delivery tube 34, and into the directing mirror 36. Thereafter, the beams are passed through the delivery tube 38 and into optical contact with the exit lens 40.

The path of the energy beam from one of the lasers (i.e., laser 20a) to a marking article 46 includes the directing mirrors 26 and 36 and the exit lens 40. In this manner, the laser beams from the lasers 20a-20g are focused as seven discrete spots or dots onto the surface of the article 46. These seven discrete dots extend preferably along a line in the X-direction which is transverse to the direction of the article movement (which is in the Z-direction, that is, perpendicular to the plane of the drawing) This line in the X-direction defines a single column of the characters or symbols for marking. As the article to be marked passes the laser head unit, each laser describes a track or line on the article surface which defines a corresponding row of the characters marked. In the prior art embodiment, the seven discrete dots are uniformly spaced thereby forming evenly spaced parallel character rows.

The turning mirrors 24a-24g are rigidly mounted and do not move during normal marking operations. However, the turning mirrors are separately adjustable for initial system alignment to provide the necessary angular separation between adjacent beams but do not generally require further movement thereafter. This is achieved by the lateral positioning of the turning mirrors along the X-direction. In this prior art embodiment, the directing mirrors 26 and 36 are also fixedly mounted about an axis extending in the Z-direction.

Even though the energy output beam from the laser 20a is highly collimated, it is not absolutely parallel but rather diverges at a known small angle $\phi$ which is approximately 4 milliradians. Accordingly, the energy from the laser 20a does not focus to a point of infinitesimal size, but to a finite dot or spot of visible proportions. The diameter of each dot is determined by the well-known relationship that the dot diameter is the product of the beam divergence $\Delta\phi$ and the focal length F as follows:

$$Dot\ Diameter = F \cdot \Delta\phi$$

For example, with a typical focal length of four inches and a beam divergence of 4 milliradians, the dot diameter is calculated to be:

$$Dot\ Diameter = 4\ inches \times .004\ radians$$
$$= 0.016\ radians$$

As is known to those skilled in the art, the spot separation of adjacent dots on the surface to be marked within each group is determined by the angular difference $\Delta\theta$ in the angular path between adjacent beams times the focal length. Thus, there is given:

$$Spot\ Separation = F \cdot \Delta\theta$$

The turning mirrors are spaced laterally in the X-direction so as to provide the angular difference $\Delta\theta$ in the angular path between adjacent beams. For the normal 4 milliradians beam, the angle $\Delta\theta$ is typically made to be equal to 4 milliradians so as to produce dots that are tangential to each other.

Although the laser marking apparatus shown in the prior art embodiment of FIG. 1 provides a highly satisfactory laser marking system, it has not been found to be free from all problems. In particular, in order to further generate increased number of dots for each vertical column so as to produce higher quality images or to print simultaneously additional lines in each column, there would be required the use of a larger number of lasers as well as RF excitation sources. As a result, there would be a substantial increase in the total systems cost thereby making this approach impractical.

Figure 2:
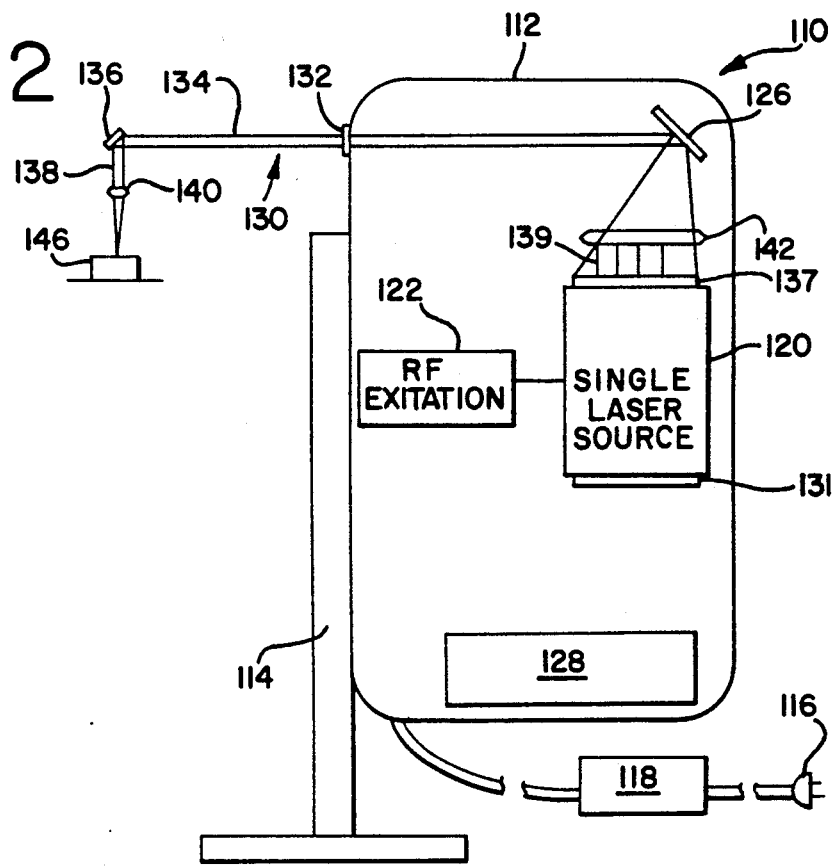
FIG. 2 is an elevational diagrammatical representation of a laser marker system, constructed in accordance with the principles of the present invention.

There is shown in FIG. 2 a diagrammatical representation of a laser marker system 110 constructed in accordance with the principles of the present invention. The laser marker system 110 represents a significant improvement over the laser marker apparatus 10 of FIG. 1. The laser system 110 includes a housing or cabinet 112 mounted on a support stand structure 114 and being adapted to receive a source of power via an A.C. wall plug 116 and a power conditioning unit 118.

The cabinet 112 is used to house a single laser source 120, a corresponding single R.F. laser excitation source 122 for the laser source, a focusing lens 142, an interior directing lens 126, and a microprocessor controller 128. A laser head unit 130 is mounted exteriorly of the upper end of the cabinet 112 via a mounting flange 132. The head unit is comprised of a horizontal beam delivery tube 134, an exterior directing mirror 136, a vertical delivery tube 138, and an exit lens 140. The directing mirror 136 is located at the intersection of the horizontal and vertical delivery tubes 134 and 138. The exit lens 140 is preferably arranged at the lower end of a vertical lens tube which is movable telescopingly in the deliver tube 138 so as to permit focusing.

The laser marker system 110 is described with reference to the same coordinates X, Y, and Z of the orthogonal coordinate system illustrated in FIG. 1. In the embodiment of the present invention, the single laser source 120 is arranged so as to extend vertically in the Y-direction in the cabinet 112, as illustrated in FIG. 2. The multiple energy output beams 139 from the single laser source are passed through its output end 137 in the Y-direction and impinge upon the focusing lens 142. The focusing lens 142 receives the multiple energy output beams 139 consisting of incident parallel energy beams and directs them onto the directing mirror 126. This redirection establishes a small angular difference between beams similar to that produced by the turning mirrors in the prior example. The directing mirror reflects the beams through the delivery tube 134 and into the directing mirror 136. Thereafter, the beams are passed through the delivery tube 138 and into optical contact with the exit lens 140.

In FIG. 3, there is shown a more detailed schematic representation of the single laser source 120 of FIG. 2. Unlike the conventional lasers 20a–20g which is designed so that each generates a single laser beam, the single laser source 120 is of a unique construction so as to produce multiple laser beams. The laser 120 is preferably a low pressure $CO_2$ gas type and is comprised of a rectangularly-shaped housing or enclosure 123 having a ceramic tube 125 formed therein so as to define a gas-filled chamber 127.

The gas-filled chamber 127 is operatively connected to ends of a pair of exciting electrodes 129a and 129b whose other ends are connectible to a pulse source of RF energy (not shown) in order to directly excite the laser into energy emission. The excited gas chamber is provided with a rear or back-reflecting mirror 131 located at its one end 133. An output-beam receiving mirror 135 is located at the other end 137 of the gas chamber 127. The mirror 135 is preferably formed as a partially reflecting mirror so that part of the IR energy beam is passed out of the gas chamber in the enclosure 123 and defines an output energy beam 139 (three of which are shown) which is to be used for marking an article. This output energy beam is used to form the image to be printed on the article. A focusing lens 142 receives the output energy beam 139 and directs the incident parallel energy beams onto the directing mirrors 126 and 136 and then onto the exit lens 140.

Instead of a one-piece back-reflecting mirror like those in the conventional lasers 20a–20g, the back-reflecting mirror 131 of the present invention is divided into a plurality of different mirror segments 131a, 131b, . . . 131n interconnected by thin portions 143. This can be best seen from FIGS. 4 and 5. This construction permits each of the mirror segments 131a–131n to be bent so that they can be moved from a lasing position to a non-lasing position. It will be noted that each of the mirror segments 131a–131n must be precisely aligned with the shared common output-beam receiving mirror 135 so that a plurality of corresponding output energy beams 139a–139n will be generated. In other words, output energy beams will only be generated for those mirror segments in the lasing position and no output energy beam will be formed for those mirror segments in the non-lasing position.

The use of the plurality of different mirror segments 131a–131n permits the selection of higher resolutions to be produced by the marking device. Further, since neither of the directing mirrors 126 or 136 are required to bend (which tends to slow down the rate at which the items to be marked can be moved past the laser head), the laser marker system of the present invention has a much faster speed of operation.

In this manner, each of the energy beams may be caused to be operative or inoperative by controlling the position or alignment of the mirror segments 131a–131n. Assuming that certain ones of the mirror segments are fully aligned, there is illustrated in FIG. 6 a column of parallel, selected output energy beams 147a–147d being generated which can be passed through the focusing lens 142. As a result, there is created a column of corresponding selected dots 148a–148d on the surface 144 of the article 146 to be marked. When it is desired to obtain a higher resolution, the number of segments in the back-reflecting mirror 130 is increased.

In FIG. 7, there is shown a schematic representation of how one individual segments 149 of the mirror segments may be flexed or bent so as to create a small movement of the back-reflecting mirror in order to cause a misalignment. As a consequence, the segment 149 will be changed from the lasing position shown in the solid line 148 to the non-lasing position shown in the dotted line 150.

The individual mirror segment 149 can be rotated about a point P at or near its center. One method of doing this is to use a piezo-electric bimorph element that is rigidly mounted at one end and is coupled to the mirror segment 149 a distance R beyond the point P as shown in FIG. 13. When the voltage is applied to the bimorph, it will be caused to bend, rotating the mirror segment 149 about a point P. The actual values being determined by the type of piezo-electric device actually employed for the required mirror displacement. Examples of piezo-electric devices suitable for present purposes include those devices manufactured by the Vernitron Division of Morgan Matroc, Inc., Bedford, Ohio.

A second method of rotating the mirror segment 149 is to employ the well-known galvanometer method. This method is not as fast as a piezo-electric device, but may be satisfactorily used for smaller mirrors and slower marking devices. Such an arrangement employs permanent magnets disposed on either side of the mirror segment which is mounted for rotation and which carries a coil. A current passing through the coil causes the mirror segment to reflect in a direction and by an amount proportional to the magnitude and polarity of the current. Other suitable techniques for rotating the mirror segment include magneto-strictive elements and for some applications, servo-mechanisms.

In FIG. 8, there is shown a bimorph element which is used to rotate the mirror segment 152 from the lasing position (solid line 154) to the non-lasing position (dotted line 156). In the lasing position, it will be noted that the surface of the mirror segment 152 has substantially a flat or slight concave configuration. In the non-lasing position, the surface of the mirror segment 152 is changed to a convex configuration.

In FIG. 9, there is shown a second alternate embodiment for the single laser source 120 in FIG. 2. It can be seen that the laser 220 is quite similar in its construction to the laser 120 of FIG. 3, except that the back-reflecting mirror 230 formed of mirror segments 230a-230n are located outside of the enclosure 222. Further, the end 232 of the enclosure is closed by an IR window 234. As a result, the mirror segments 230a-230n are more convenient to assemble and to control since they are located on the outside of the enclosure 222 thereby making them more easily accessible. Except for these differences, the operation of the laser 220 is identical to the laser 120 of FIG. 3.

In FIG. 10, there is shown a third alternate embodiment for the single laser source 120 which is configured to provide a multiple, low pressure laser system. The multiple laser system includes a rectangularly-shaped ceramic block 310 having a plurality of cavities 312a-312n defining multiple laser channels. All of the channels are excited by a common RF excitation source of energy. It should be understood to those skilled in the art that the number of cavities or channels correspond to the number of mirror segments. Thus, the output energy beams will be in the lasing position or non-lasing position dependent upon the alignment of the mirror segments associated with the corresponding channels. While it is not necessary to separate the individual channels from each other so that the gas mixture is allowed to flow between the channels, a plurality of barriers 320 may be formed in which each is disposed between adjacent channels so as to reduce interaction of one energy beam with another one.

In FIG. 11, there is illustrated another alternate embodiment of how the back-reflecting mirrors are changed from the lasing position to the non-lasing position. It can be seen that the laser 420 is quite similar in its construction to the laser 120 of FIG. 3, except that there has been added a Q switch 422 which is located in front of the back-reflecting mirror 424 formed of mirror segments 424a-424n. The Q switch is preferably comprised of a plurality of liquid crystal gates 422a-422n (FIG. 11). These may consist of a suitable liquid crystal material between transparent, electrically conductive plates. When no voltage is applied between the plates, across the liquid crystal material, the crystals are in a diverse orientation and the assembly is opaque. When sufficient voltage is applied, the crystals align and the element becomes transparent. In this state, the Q switch is on and the element of the laser system in which it is located will lase. As a result, the number of corresponding output energy beams from the associated mirror segments 424a-424n are controlled by selectively turning on certain ones of the liquid crystal energy gates. Except for these differences, the operation of the laser 420 is identical to the laser 120 of FIG. 3.

In FIG. 12, there is depicted a fourth alternate embodiment for the single laser source which is configured to provide a multiple, low pressure laser system. It can be seen that the multiple laser system of FIG. 12 is quite similar in its construction to the laser system of FIG. 10, except the plurality of barriers 520 used to form the plurality of cavities 512a-512n are made to taper inwardly from its front end to its rear end. In this manner, the output energy beams in each corresponding channel will be caused to impinge upon the directing mirror 126 of FIG. 2 without the necessity of the focusing lens 142.

From the foregoing detailed description, it can thus be seen that the present invention provides an improved laser marker system for marking indicia to a substrate in which the number of dot positions in a vertical column is increased. The present laser marker system includes a single laser source having segmented reflecting means for generating a plurality of output energy beams to create a column of spots on a substrate. The segmented reflecting means consists of a back-reflecting mirror which is formed of a plurality of different mirror segments. Further, there is provided a device for moving each of the plurality of different mirror segments between a lasing position and a non-lasing position to vary the number of output energy beams and thus the number of spots on the substrate.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A laser marker system for marking indicia onto a substrate, comprising:
   an exit lens having a focal length, the surface of the substrate to be marked being positioned generally at the focal plane of the lens;
   a single laser source arranged so that its energy output beams are oriented in a generally parallel relationship; and
   said single laser source including segmented reflecting means for generating a plurality of output energy beams to create a column of spots on the substrate with a higher resolution.

2. A laser marker system as claimed in claim 1, wherein said segmented reflecting means is comprised of a back-reflecting mirror which is formed of a plurality of different mirror segments.

3. A laser marker system as claimed in claim 2, further comprising means for moving each of said plurality of different mirror segments between a lasing position and a non-lasing position to vary the number of output energy beams and thus the number of spots on the substrate.

4. A laser marker system as claimed in claim 2, wherein said plurality of mirror segments are located on an end of an enclosure containing a gas-filled chamber.

5. A laser marker system as claimed in claim 2, wherein said plurality of mirror segments are located outside of an enclosure containing a gas-filled chamber.

6. A laser marker system as claimed in claim 5, wherein an IR window is positioned on the end of the enclosure containing the gas-filled chamber.

7. A laser marker system as claimed in claim 1, wherein said single laser source is formed in a multi-cavity block so as to define multiple laser channels.

8. A laser marker system as claimed in claim 7, further comprising a plurality of barriers in which each is disposed between adjacent channels so as to reduce interaction of one energy beam with another one.

9. A laser marker system as claimed in claim 3, wherein said means for moving each of said plurality of different mirror segments includes means for rotating said mirror segments.

10. A laser marker system as claimed in claim 3, wherein said means for moving each of said plurality of different mirror segments includes means for flexing said mirror segments.

11. A laser marker system for marking indicia onto a substrate, comprising:
    a single laser source arranged so that its energy output beams are oriented in a generally parallel relationship;
    a delivery tube through which the output beam travels;
    an exit lens disposed at the end of the delivery tube remote from said plurality of lasers and onto which the energy output beams are directed for focusing onto said substrate positioned at the focal plane of the lens; and
    said single laser source including segmented reflecting means for generating a plurality of output energy beams to create a column of spots on the substrate with a higher resolution.

12. A laser marker system as claimed in claim 11, wherein said segmented reflecting means is comprised of a back reflecting mirror which is formed of a plurality of different mirror segments.

13. A laser marker system as claimed in claim 12, further comprising means for moving each of said plurality of different mirror segments between a lasing position and a non-lasing position to vary the number of output energy beams and thus the number of spots on the substrate.

14. A laser marker system as claimed in claim 12, wherein said plurality of mirror segments are located on an end of an enclosure containing a gas-filled chamber.

15. A laser marker system as claimed in claim 12, wherein said plurality of mirror segments are located outside of an enclosure containing a gas-filled chamber.

16. A laser marker system as claimed in claim 15, wherein an IR window is positioned on the end of the enclosure containing the gas-filled chamber.

17. A laser marker system as claimed in claim 11, wherein said single laser source is formed in a multi-cavity block so as to define multiple laser channels.

18. A laser marker system as claimed in claim 17, further comprising a plurality of barriers in which each is disposed between adjacent channels so as to reduce interaction of one energy beam with another one.

19. A laser marker system as claimed in claim 13, wherein said means for moving each of said plurality of different mirror segments includes means for rotating said mirror segments.

20. A laser marker system as claimed in claim 13, wherein said means for moving each of said plurality of different mirror segments includes means for flexing said mirror segments.

21. A laser marker system for generating a plurality of coherent energy beams to mark indicia onto a substrate, comprising:
    an exit lens having a focal length, the surface of the substrate to be marked being positioned generally at the focal plane of the lens;
    a single laser source arranged so that its energy output beams are oriented in a generally parallel relationship; and
    said single laser source directed at a segmented reflecting means for generating a plurality of output energy beams each said beams of sufficient energy to create a spot on the substrate.

* * * * *

UNITED STATES PATENT AND TRADEMARK OFFICE
CERTIFICATE OF CORRECTION

PATENT NO. : 5,294,774
Date : March 15, 1994
INVENTOR(S) : J. James Stone

It is certified that error appears in the above-identified that said Letters Patent is hereby corrected as shown below:

Claim 11 should read as follows:

11. A laser marker system for marking indicia onto a substrate, comprising:
  a single laser source including segemented reflecting means for generating a plurality of energy output beams arranged so that its energy output beams are oriented in a generally parallel relationship;

a delivery tube through which the output beams travels;

an exit lens disposed at the end of the delivery tube remote from said laser source and onto which the energy output beams are directed for focusing onto said substrate positioned at the focal plane of the lens to create a column of spots on the substrate.

Signed and Sealed this

Nineteenth Day of July, 1994

*Attest:*

BRUCE LEHMAN

*Attesting Officer*      *Commissioner of Patents and Trademarks*